US006755539B2

(12) United States Patent
Brennesholtz

(10) Patent No.: US 6,755,539 B2
(45) Date of Patent: *Jun. 29, 2004

(54) REFLECTIVE LCD PROJECTOR

(75) Inventor: Matthew S. Brennesholtz, Pleasantville, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 10/313,692

(22) Filed: Dec. 6, 2002

(65) Prior Publication Data
US 2003/0133084 A1 Jul. 17, 2003

Related U.S. Application Data

(63) Continuation of application No. 09/605,489, filed on Jun. 28, 2000, now Pat. No. 6,508,557.

(51) Int. Cl.[7] ........................ G03B 21/28; G03B 21/00; G03B 21/26; G03B 21/14

(52) U.S. Cl. .............................. 353/98; 353/33; 353/34; 353/37; 353/97; 353/99; 349/7; 349/67

(58) Field of Search ............................. 353/98, 33, 34, 353/37, 97, 99; 349/7, 67

(56) References Cited

U.S. PATENT DOCUMENTS 6,227,670 B1 * 5/2001 Numazaki et al. ............ 353/31
6,508,557 B1 * 1/2003 Brennesholtz ............... 353/98

* cited by examiner

Primary Examiner—Russell Adams
Assistant Examiner—Magda Cruz

(57) ABSTRACT

An apparatus for projecting an image includes a light source, a polarization modulator, a projection lens, and a mirror. The mirror is positioned between the light source and the modulator and blocks a cross-sectional portion of the light from the light source from reaching the modulator. Light from the light source that reaches the modulator has its polarization modulated in accordance with a video signal to be displayed to produce a modulated signal corresponding to the video signal. The modulated light signal is reflected from the mirror into a projection lens.

9 Claims, 5 Drawing Sheets

REFLECTIVE LCD PROJECTOR

CROSS REFERENCE TO RELATED APPLICATIONS

This is a continuation of application Ser. No. 09/605,489, filed Jun. 28, 2000 now U.S. Pat. No. 6,508,557.

TECHNICAL FIELD

This invention relates to LCD projectors, and more particularly, to a method and apparatus for providing an LCD projector that eliminates inefficiencies present in prior systems by maximizing the useful area for projection.

BACKGROUND AND SUMMARY

Generic LCD projectors are becoming more widely used in business applications. These types of projectors are typically used for business presentations, educational sessions, etc.

FIG. 1 shows a typical reflective liquid crystal device (LCD) projector. The arrangement of FIG. 1 represents a monochrome type of projector, but extension to color systems is known to those of skill in the art. For example, color systems may be implemented using an X-cube and a plurality of different color specific modulators. This technique is well known in the art, and will not be described in detail.

In the arrangement of FIG. 1, LCD 101 is a matrix of reflective LCD elements. Each element may rotate the polarization of incident light by up to 90 degrees. A polarizing beam splitter 102 passes light polarized in a first direction but reflects light polarized in a second and orthogonal direction.

In operation, light from lamp 104 is prepolarized by prepolarizer 105 and transmitted horizontally through polarized beam splitter (PBS) 102. The light exiting lamp 104 is collimated into substantially parallel columns. The polarized light passes plane 107 and is incident upon LCD 101.

The elements of R-LCD 101 are arranged to change the polarization of the incident light in accordance with a video signal driving R-LCD 101. This technique results in the light being reflected back from R-LCD 101 in a variety of different states. More specifically, some of the light is reflected back after having its polarization rotated, and other light remains polarized in the same direction as when it was initially incident upon R-LCD 101. Additionally, the light may have its polarization only partially rotated, providing for shades of gray. Each of the numerous elements in the LCD matrix may independently rotate the polarization of incident light by a different amount.

Upon being reflected back, the light which has not had its polarization changed passes back through plane 107 and is absorbed. Light which was incident upon R-LCD elements and which did have its polarization changed will not pass through plane 107, but will instead be reflected up through the post-polarizer 109 for projection as an image through projection lens 110. Light which has had its polarization changed by some degree will partially pass and result in gray shades rather than black and white. In short, the polarization may be rotated by any amount between zero and 90 degrees, with angles between these two extremes representing shades of gray.

Several problems exist with R-LCD projectors of the type shown in FIG. 1. One problem is that the rays are not strictly S-polarized or P-polarized as they hit the plane 107. This results in decreased contrast. For a more complete description of this problem and a proposed solution, see U.S. Pat. No. 5,453,859, issued Sep. 26, 1995.

Another problem associated with the systems of the type shown in FIG. 1 is stressed induced birefringence in the PBS 102. This phenomenon occurs because the PBS is warmed non-uniformly by the optical beam passing through it. The differential warming of the glass induces stress in the glass, which in turn induces birefringence in the glass. Prior attempts at solving the problem have been less than optimum.

A second prior art LCD projector design utilizes an off-axis LCD projector of the type shown in FIG. 2. A lamp 104 and prepolarizer 105 transmit polarized light to a reflective LCD 101. The polarization of the light is then either changed or not, or changed to some degree, by the state of the various LCD elements. As was the case for FIG. 1, the LCD elements are driven by a video signal, and thus, the polarization of the reflected light beam 203 has been modulated in accordance with the video signal. That reflected light beam is then transmitted through a post-polarizer 109 for projection via lens 110.

The basic problem with the arrangement of FIG. 2 is the inefficient use of the pupil of the projection lens, which is located approximately at plane "B." More specifically, a large portion of the optical beam that would otherwise be captured by the projection lens is blocked by the path of the light from lamp 104. Thus, the usable pupil of the system is approximately one quarter of the full pupil of the projection lens, significantly reducing system efficiency. FIG. 3 depicts the pupil utilization in the prior art off-axis projector such as that shown in FIG. 2. It can be seen that about three quarters of the pupil area is wasted.

In view of the above there exists a need in the art for an improved reflective LCD projector which can efficiently utilize a larger pupil area and which eliminates the foregoing problems.

The above and other problems with the prior art are overcome in accordance with the present invention. A light source provides light to a modulator, which reflects back a modulated light signal that has been modulated in accordance with a video signal to be imaged. A mirror is interposed between the light source and the modulator. A portion of the light from the light source is blocked from reaching the modulator by the back of the mirror, but the modulated reflected light is focused entirely on the reflecting surface of the mirror and reflected through a projection lens by the mirror.

The mirror is positioned such that it only blocks a small portion of the incident light from the light source, thereby increasing efficiency. It may be placed directly in the path of incident light. In an additional embodiment, the mirror may be curved.

In a preferred embodiment, the modulator is a matrix of R-LCD elements.

Color may be obtained by utilizing an X-cube or similar device.

DETAILED DESCRIPTION

Figure 1:
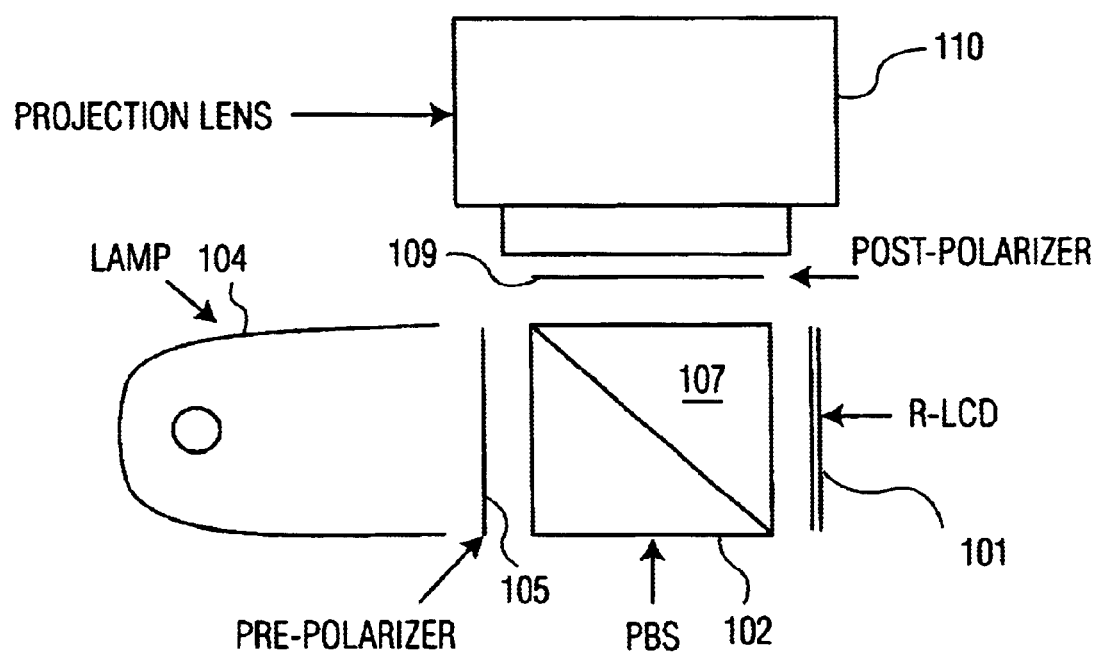
FIG. 1 in the prior art LCD projector.
Figure 2:
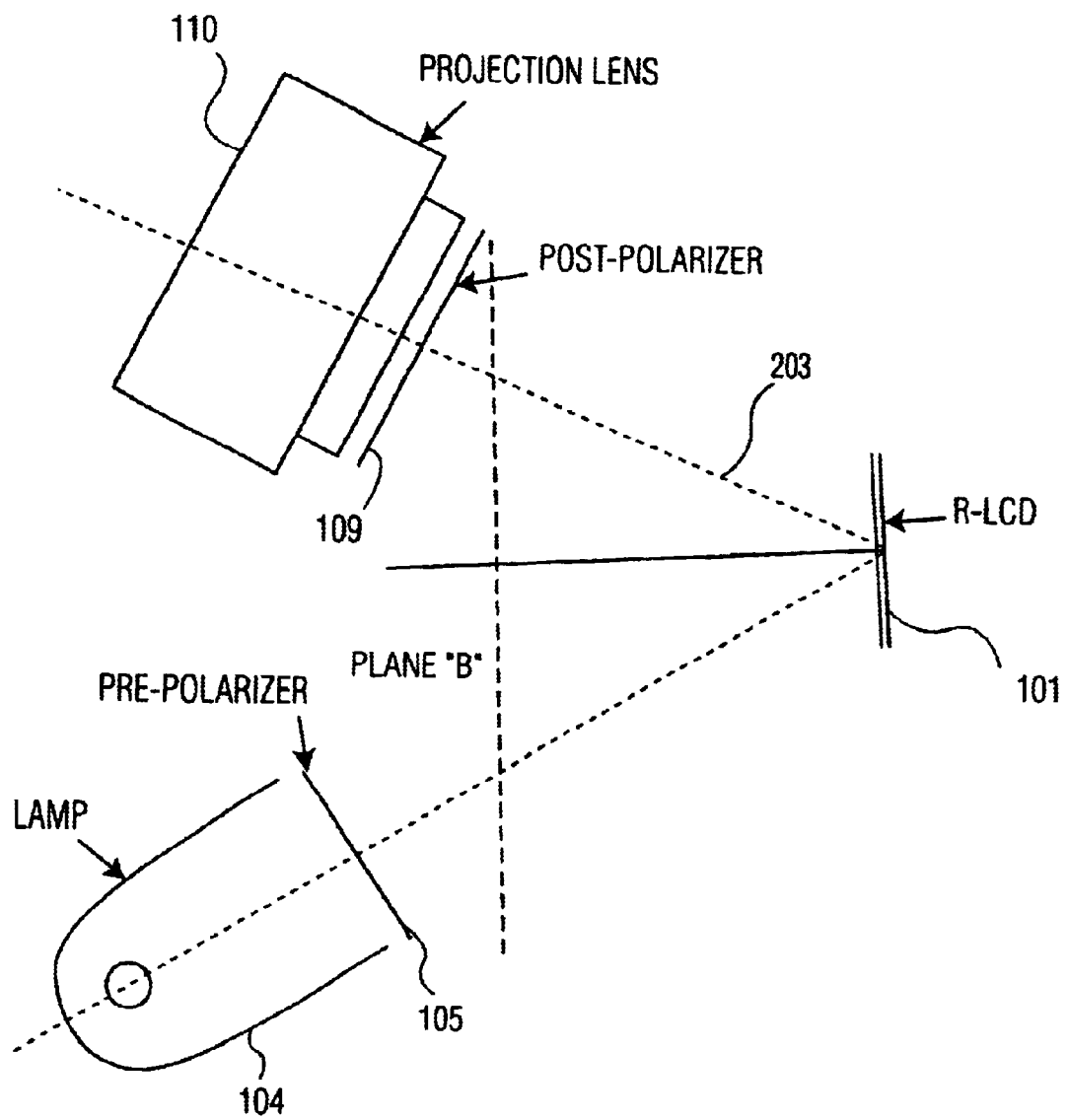
FIG. 2 is a different type of prior art LCD projector.
Figure 3A:
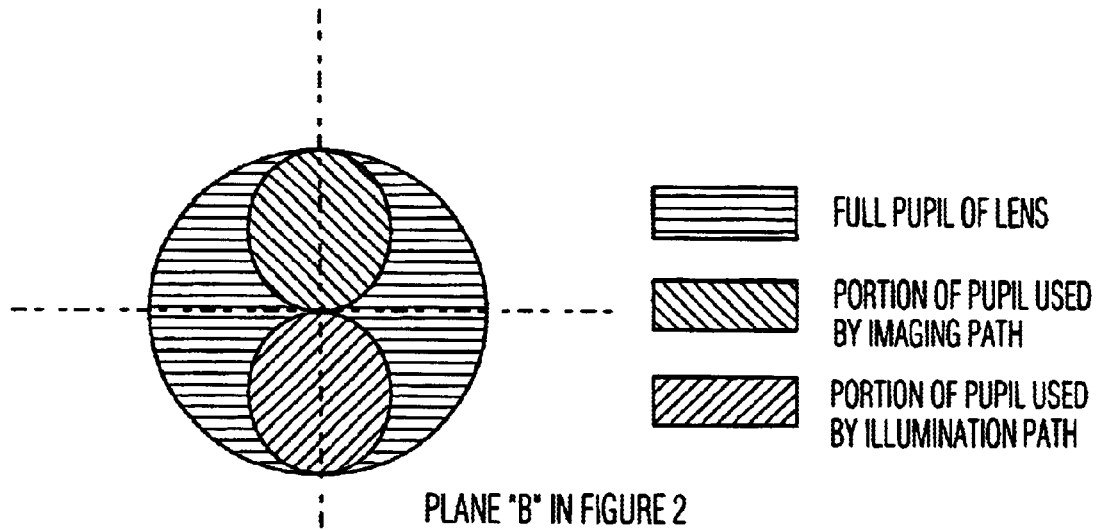
FIG. 3a shows a depiction of an inefficient use of the pupil in the prior art arrangement of FIG. 2.
Figure 3B:
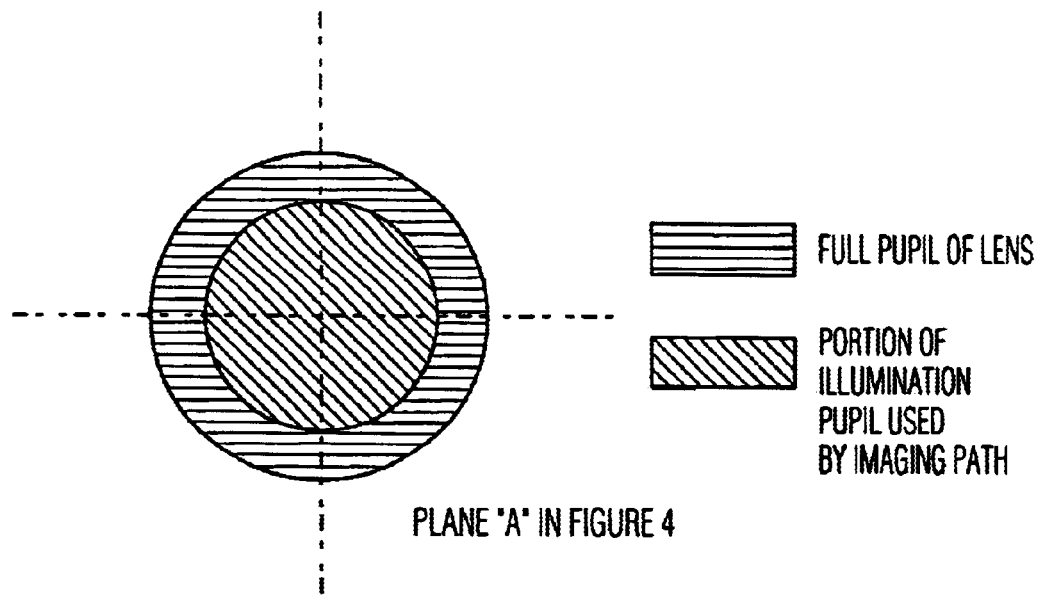
FIG. 3b shows a depiction of the utilization of the pupil in the illumination path of the current invention.
Figure 4:
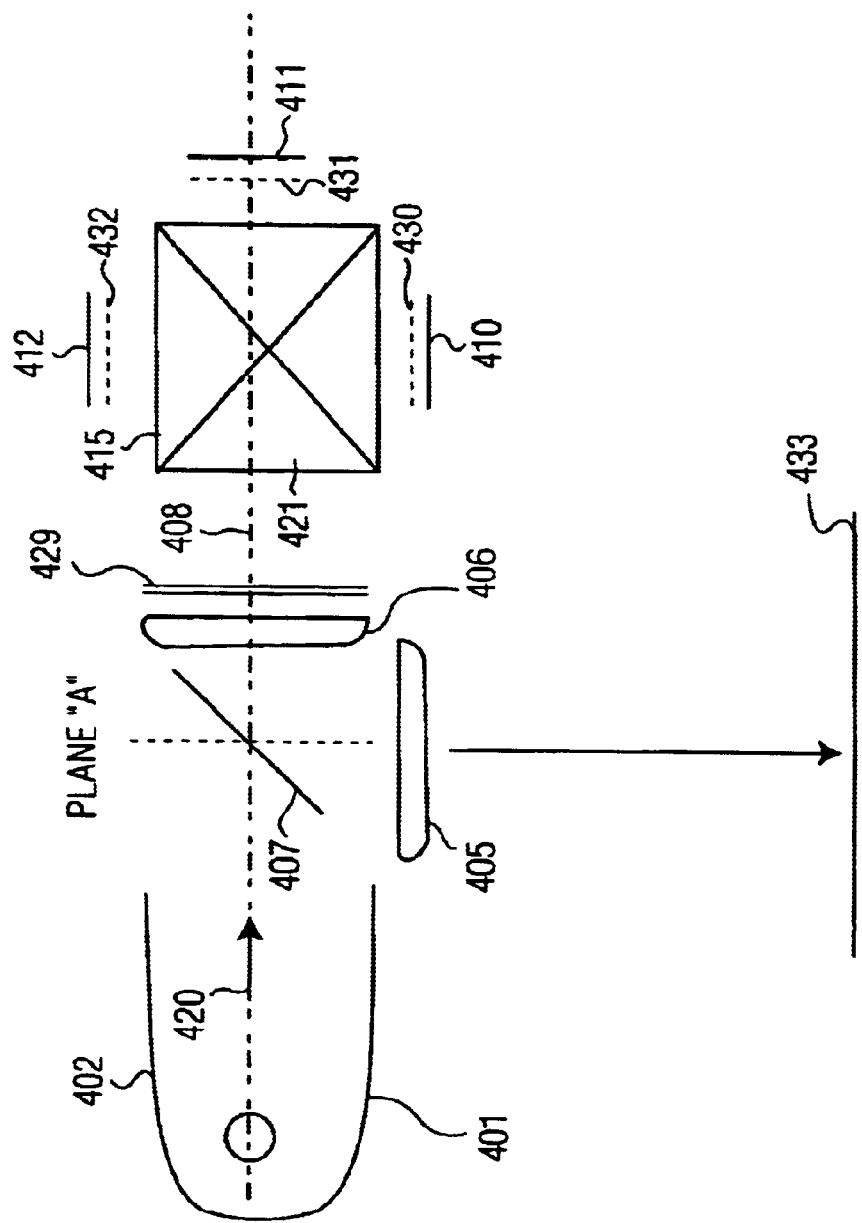
FIG. 4 shows an exemplary embodiment of the present invention.

FIG. 4 shows an exemplary embodiment of the present invention including a light source 401, lenses 405 and 406, a mirror 407 and polarizer 429, and an LCD 411. Modulators 410–412 and X-cube 415 provide color in a conventional manner. It is noted that polarizers 430–432 may be used instead of, not in addition to, polarizer 429. For explanation we assume polarizer 429 is utilized.

Figure 5A:
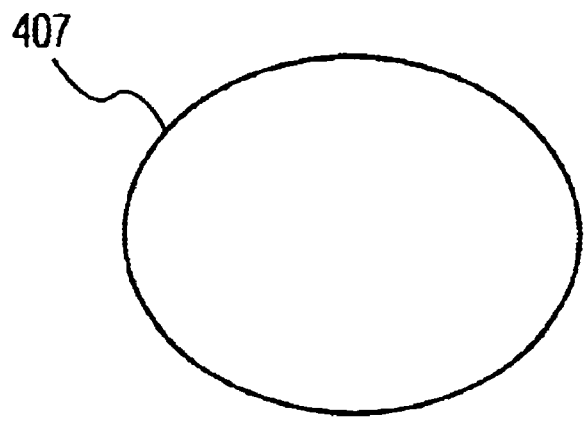
FIG. 5a illustrates an elliptical mirror of an exemplary embodiment of the invention.

In operation, light from source 401 leaves reflector 402 and is transmitted substantially parallel towards lens 406. Mirror 407 blocks the light from passing left to right over a substantially circular cross-sectional area. Since the mirror 407 is tilted as shown, the mirror is elliptical in shape in this embodiment, as shown in FIG. 5*a*, such that the cross-section, viewing the tilted mirror from point 420, is circular. In a prototype, a mirror from Edmund Scientific model number 30837, was found to give satisfactory performance. The circular cross section of the mirror may b substantially concentric with a cross section of the light emitted by light source 401. Plane "A" is located approximately at the pupil plane of the illumination path.

Figure 5B:
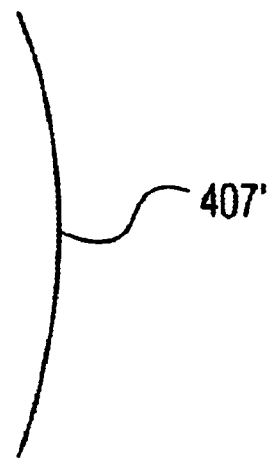
FIG. 5*b* is a side view of a curved mirror of a possible embodiment of the invention.

The mirror may also be curved slightly in order to add power to the projection lens, as with the mirror 407' shown in FIG. 5*b* for example. More specifically, if the mirror is curved, power may be added to the projection lens even though elements 405 and 406 of the projection tens remain at the same power. Given the design and performance parameters of the mirror, those of skill in the art can readily calculate the required curvature, and software packages for performing such calculations are available commercially.

After passing the mirror, the light 408 then passes through lens element 406 but contains a substantially circular dim portion, which represents the cross-section that has been blocked by mirror 407. After being polarized, the light is transmitted through X-cube 415 and is modulated by the R-LCDs 410, 411 and 412.

After reflecting off of the LCD matrix 411, and being modulated thereby, the light is then transmitted back through X-cube 415 and polarizer 429. The reflected light is then focused upon the reflecting surface of mirror 407 for projection through projection lens elements 405–407 to projection screen 433. Note that 406 and 405 must act together as two elements of the projection lens, along with mirror 407. Although we refer to lenses 405 and 406, these lenses actually act together as lens elements to form a projection lens with mirror 407.

The operation of the X-cube 415 will not be described in specific detail since such an X-cube is known to those of skill in this art. Suffice it to say however, that white light enters the cube at surface 421 and the red, green and blue components are directed toward modulators 410, 411 and 412 respectively. The polarization of the red, green and blue components of the white light is modulated by modulators 410, 411 and 412 respectively. The red, green and blue components then are recombined into white light and the white light then exits the X-cube at surface 421. After passing through polarizer 429, the components with the undesired polarization are removed and the white light beam has been modulated in accordance with the video signal driving the LCDs 410, 411 and 412. This technique is conventional to those of skill in the art and will not be described in detail herein.

The distance between lens element 406, R-LCD matrix 411 and mirror 407 is such that the light incident upon lens element 406 is focused upon mirror 407. It is noted that the polarizer 429 may be relocated in positions 430, 431 and 432 as indicated in FIG. 4. These additional positions are preferred as they result in no optical elements being placed between the polarizer and the LCD which gives maximum contrast. This location for the polarizer also results in the reduced power loading on the polarizers due to the fact that there are separate polarizers in the red, green and blue channels. This results in increased lifetime. Note that due to the presence of mirror 407 in the pupil plane "A", the system cannot be telecentric, unlike most other reflective LCD projection systems.

The system as described represents a full color projector. A monochrome projector could be built in accordance with the invention by omitting the X-prism 415, light modulators 410 and 412 and polarizers 430 and 432 if polarizers 430–432 are used rather than polarizer 429.

While the above describes the preferred embodiment of the invention, various modifications will be apparent to those of skill in the art. Such modifications are intended to be covered by the following claims.

What is claimed:

1. An apparatus for projecting an image comprising:
    a light source that produces light;
    a modulator able to modulate polarization of the light in accordance with a video signal to be displayed to produce a modulated light signal corresponding to the video signal;
    a projection lens; and
    a mirror positioned between the light source and the modulator so that it blocks a cross-sectional portion of the light of the light source from reaching the modulator, and reflects the modulated light signal into the projection lens.

2. The apparatus of claim 1 wherein said cross-sectional portion of said light blocked by said mirror is substantially circular.

3. A method of producing an image for display comprising the steps of:
    directing a light source toward a reflective LCD matrix;
    modulating polarization associated with said light in a manner that is indicative of a video signal to be displayed to produce a modulated light signal;
    reflecting said modulated light signal back to a mirror that is positioned between said light source and said LCD matrix so as to block a cross-sectional portion of the light of the light source from reaching the reflective LCD matrix; and
    further reflecting said modulated light off of said mirror and through a projection lens.

4. The method of claim 3 wherein said light is modulated by at least three different modulators, each one of which modulates light of a different color.

5. The method of claim 4 wherein said mirror is substantially elliptical in shape.

6. The method of claim 4 wherein the mirror is curved.

7. A method of producing an image using a reflective LCD and a light source, the method comprising the steps of transmitting light onto the reflective LCD device, and modulating the light in accordance with a video signal indicative of the image to be displayed, parallel columns of light being transmitted to the reflective LCD device along a path that is interrupted with a reflecting mirror such that a cross-sectional portion of said light is blocked from reaching the LCD, and reflecting a portion of light not so blocked and which thus reaches the reflective LCD back onto the reflecting surface of said mirror for transmission to a projection lens element.

8. The method of claim 7 wherein said light is also transmitted through an X-cube.

9. The method of claim 7 wherein the light is modulated by changing its polarity, and wherein said modulated light is transmitted through a polarizer.

* * * * *